Sept. 13, 1938.  L. LANIE  2,130,096
PNEUMATIC TIRE
Filed Aug. 18, 1936
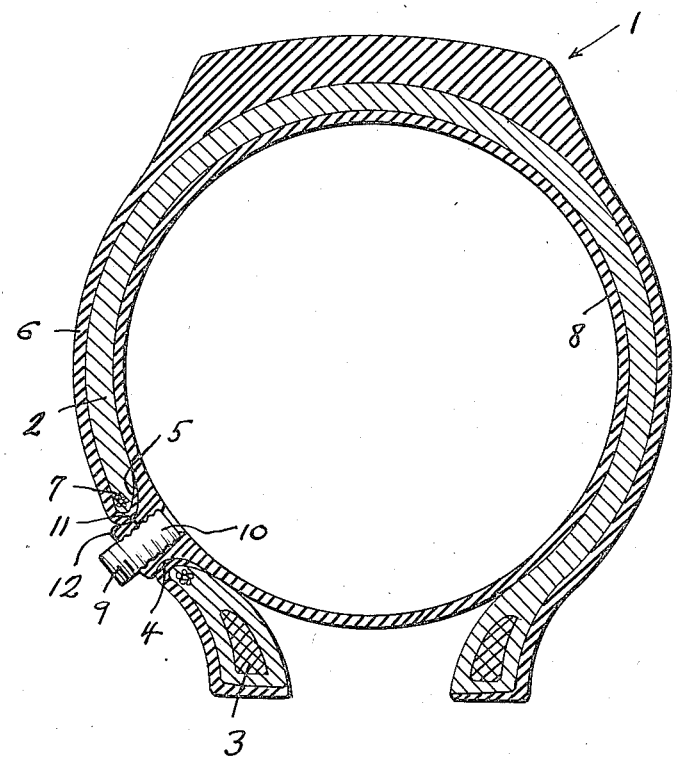
Inventor
Leo Lanie
By *Clarence A. O'Brien*
*Hyman Berman*
Attorneys Patented Sept. 13, 1938

2,130,096

UNITED STATES PATENT OFFICE 2,130,096

PNEUMATIC TIRE

Leo Lanie, Manchester, Okla.

Application August 18, 1936, Serial No. 96,677

5 Claims. (Cl. 152—429)

The present invention relates to new and useful improvements in pneumatic vehicle tires of the type including a casing and an inner tube and has for its primary object to provide, in a manner as hereinafter set forth, a tire of this character embodying a novel construction and arrangement of inflating valve whereby the inner tube will be permitted to move with the casing should said casing creep on the rim, as frequently occurs on tractors, trucks, etc., thereby preventing the valve from being torn from the tube.

Another very important object of the invention is to provide a pneumatic tire comprising a casing having an opening therein which accommodates the inflating valve, together with a novel construction and arrangement for preventing the entrance of water and other foreign matter through said opening.

Other objects of the invention are to provide a pneumatic tire of the character described which will be comparatively simple in construction, strong, durable, highly efficient and reliable in use and which may be manufactured at low cost.

All of the foregoing and still further objects and advantages of the invention will become apparent from a study of the following specification, taken in connection with the accompanying drawing wherein:

The single view is a cross section through a pneumatic tire constructed in accordance with the present invention.

Referring now to the drawing in detail, it will be seen that the embodiment of the invention which has been illustrated comprises a casing which is designated generally by the reference numeral 1. The casing 1 has formed in one of its side walls 2, adjacent the bead 3, a circular opening 4. The walls of the opening 4 are covered by an annular flange 5 which is integral with the rubber 6 of the casing 1. The flange 5, it will be noted, tapers toward its free end. A reinforcing cable 7 or the like strengthens the walls of the opening 4, said cable encircling the flange 5.

The reference numeral 8 designates an inflatable inner tube in the casing 1. Anchored in the tube 8 and projecting therefrom is an inflating valve 9. A neck 11 is formed integrally with the tube 8 and encircles the valve 9, the outer end of said neck being faced inwardly from the corresponding end of said valve. The neck 11 has formed on its outer end portion a bead 12. The valve 9 is circumferentially corrugated or ribbed as at 10, for anchoring said valve firmly in the neck 11.

As clearly shown in the drawing, the neck 11 and the valve 9 are adapted to be inserted through the opening 4 of the casing 1, said valve projecting sufficiently to permit the application thereto of an inflating nozzle and the usual cap. It will be noted that the neck 11 and the bead 12 comform to the shape of the opening 4, the construction and arrangement being such as to prevent the entrance of water or other foreign matter.

Further, the bead 12 serves to releasably anchor the neck 11 in the opening 4. It may be well to here state that the valve 9 is preferably molded in the tube 8. It will thus be seen that the construction and arrangement is such that tube 8 is free to move around the rim or wheel with the casing 1 should creeping of said casing occur. The valve 9 may comprise any suitable core.

It is believed that the many advantages of a pneumatic tire constructed in accordance with the present invention will be readily understood, and although the preferred embodiment of the device is as illustrated and described, it is to be understood that changes in the details of construction may be resorted to which will fall within the scope of the invention as claimed.

What is claimed is:

1. A pneumatic tire comprising a casing having an opening therein, an inflatable tube mounted in said casing, an inflating valve mounted in the tube and projecting through the opening, a neck integral with the tube and encircling the valve, and an anchoring bead on the free end portion of the neck, said neck and bead being engaged with the walls of the opening for sealing said opening around the valve.

2. A pneumatic tire of the class described comprising a casing having a circular opening in one of the side walls thereof, a rubber covering on the walls of the opening, a substantially annular reinforcing element enclosed in the casing around the opening and encircling the rubber covering, an inflatable tube mounted in the casing, an inflating valve mounted in said tube and projecting through the opening, a neck integral with the tube and encircling the valve and projecting into the opening, and an anchoring bead on the outer end portion of the neck, said neck and bead being engaged with the rubber covering and conforming in shape thereto for sealing the opening around the valve, said valve being corrugated for anchoring same in the neck.

3. A pneumatic tire comprising a casing having an opening in the wall thereof, an inflatable tube mounted in the casing, a resilient nipple formed on the wall of the tube and projected through the opening in the casing, an inflating valve mounted in said nipple and means on the outer end of the nipple positioned outwardly of the casing and cooperating with the walls of the opening in the casing to retain the nipple therein.

4. A pneumatic tire comprising a casing having an opening in the wall thereof, an inflatable tube mounted in the casing, a resilient nipple formed on the wall of the tube and projected through the opening in the casing, an inflating valve mounted in said nipple and a formation on the outer end of the nipple positioned outwardly of the casing and cooperating with the walls of the opening in the casing to retain the nipple therein.

5. A pneumatic tire comprising a casing having an opening therein, an inflatable tube mounted in said casing, an inflating valve mounted in the tube and projecting through the opening, a neck formed from the tube material and encircling the valve and an anchoring bead formed as a continuation of the free end portion of the neck, said neck and bead being engaged with the walls of the opening for sealing said opening about the valve.

LEO LANIE.